United States Patent [19]
Bonner

[11] Patent Number: 5,610,236
[45] Date of Patent: Mar. 11, 1997

[54] POLYMER BLENDS OF PVC AND POLYKETONES

[75] Inventor: James G. Bonner, Edinburgh, Scotland

[73] Assignee: BP Chemicals Limited, London, England

[21] Appl. No.: 393,322

[22] Filed: Feb. 23, 1995

[30] Foreign Application Priority Data

Feb. 25, 1994 [GB] United Kingdom ............ 9403701

[51] Int. Cl.$^6$ .................................. C08G 67/02
[52] U.S. Cl. ........................... 525/185; 525/539
[58] Field of Search ..................... 525/185, 539

[56] References Cited

U.S. PATENT DOCUMENTS

| | | | |
|---|---|---|---|
| 2,541,987 | 8/1948 | Cramer | 524/321 |
| 4,137,382 | 1/1979 | Vetter, Jr. | 528/271 |
| 5,084,510 | 1/1992 | Braden et al. | 525/64 |
| 5,204,412 | 4/1993 | Davidson et al. | 525/539 |
| 5,209,983 | 5/1993 | Case et al. | 525/185 |
| 5,232,786 | 8/1993 | Waters et al. | 428/475.8 |

FOREIGN PATENT DOCUMENTS

| | | |
|---|---|---|
| 695883 | 10/1964 | Canada ............ 525/185 |
| 0101833 | 3/1984 | European Pat. Off. . |
| 0298282 | 1/1989 | European Pat. Off. . |
| 2277855 | 6/1976 | France . |
| WO90/13600 | 11/1990 | WIPO . |
| WO92/07029 | 4/1992 | WIPO . |

*Primary Examiner*—Thomas Hamilton, III
*Attorney, Agent, or Firm*—Fay, Sharpe, Beall, Fagan, Minnich & McKee

[57] ABSTRACT

A polymer blend composition comprises a polyketone and PVC provided that the polyketone is not a propylene/CO copolymer having a molecular weight of less than 10,000. The softening point of PVC can be increased by blending with polyketones. Blends of polyketones and unplasticised PVC are particularly preferred.

11 Claims, No Drawings

POLYMER BLENDS OF PVC AND POLYKETONES

The present invention relates to a polymer blend composition comprising a polyketone and PVC in particular uPVC.

For the purposes of this patent, polyketones are defined as linear polymers having an alternating structure of (a) units derived from carbon monoxide and (b) units derived from one or more olefinically unsaturated compounds.

Such polyketones have the formula:

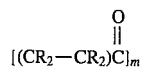

where the R groups are independently hydrogen or hydrocarbyl groups, and m is a large integer; they are disclosed in several patents e.g. U.S. Pat. No. 3,694,412. Processes for preparing the polyketones are disclosed in U.S. Pat. No. 3,694,412 and also in EP 181014 and EP 121965. Although for the purposes of this patent polyketones correspond to this idealised structure, it is envisaged that materials corresponding to this structure in the main but containing small regimes (i.e. up to 10 wt %) of the corresponding homopolymer or copolymer derived from the olefinically unsaturated compound, also fall within the definition.

Polyketones particularly those prepared using ethylene and CO have high melting points which are close to the temperatures at which they undergo chemical degradation. EP 213671 teaches that polyketones comprising carbon monoxide, ethylene and an alpha olefin (eg propylene) units have lower melting points than corresponding copolymers comprised only of carbon monoxide and ethylene units.

uPVC on the other hand has a relatively low "melting point" and softening point. However, in certain applications using PVC, in particular uPVC, a higher service temperature is required. Although properties of PVC such as stiffness, strength and toughness are generally acceptable for most applications, PVC is excluded for some applications because its softening point is too low. Therefore the problem to be solved is to increase the softening point of PVC while maintaining good physical properties when fabricated into articles.

It has now been found that the softening point of PVC can be increased by blending the PVC with polyketones while maintaining the compatibility of the two polymers in the polymer blend. Since the two polymers are compatible, they do not phase separate significantly and good physical properties are maintained upon fabrication.

Thus according to the present invention there is provided a polymer blend composition comprising a polyketone and PVC provided that the polyketone is not a propylene/CO copolymer having a Molecular weight of less than 10,000.

The present invention solves the problem of increasing the softening point of PVC by blending with a polyketone.

Although blends of PVC and polyketones have been previously disclosed in WO 92/07029, the polyketones were low molecular weight polymers and were used as plasticisers.

As noted above for the purposes of this patent, polyketones are defined as linear polymers having an alternating structure of (a) units derived from carbon monoxide and (b) units derived from one or more olefinically unsaturated compounds. Suitable olefinic units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30. Typically, the polyketone will be a copolymer of ethylene/propylene/CO where the propylene is in the range 5–8% e.g. 6% by weight of the polymer. The Melt Flow Rate (5 kg load at 240° C.) is typically in the range 5–200 preferably 10–150, more preferably 20–100 for example 40–80 g/10 mins.

The polyketone will suitably have a number average molecular weight of between 40,000 and 1,000,000 preferably between 50,000 and 250,000 for example 60,000 to 150,000. A preferred polyketone is a ethylene/propylene/CO terpolymer having a number average molecular weight in the range 60,000 to 150,000.

As regards the PVC it can be either Plasticised (Flexible) PVC or unplasticised (rigid) PVC (uPVC); it is particularly with uPVC that this invention is concerned. uPVC is used for example in pipes, window frames and electrical housings. Where uPVC is used, it may contain a small amount for example up to 20% but preferably less than 5% by weight of plasticisers; however where a more flexible material is needed, plasticised PVC will be used. Typical plasticisers are phthalates, phoshates, and trimellitates.

As regards the Molecular Weight of PVC, this is measured by its K-value. PVCs will typically have a K-value in the range 45 to 100, preferably 50 to 80 especially 55 to 75, e.g. 60 to 70.

The PVC may comprise conventional additives such as heat stabilisers, blowing agents (for foams) filler, lubricants and pigments.

The polymer blend composition of the present invention can be prepared using conventional techniques and equipment for batch or continuous blending.

The weight ratio of polyketone to PVC is suitably in the range 1:10 to 10:1 preferably 1:3 to 3:1 more preferably 1:1.5 to 1.5:1 for example 1:1. However, where the mechanical properties of polyketone is to be improved, then it is preferred to use 1–20% by weight of PVC preferably 5–15% e.g 10% (i.e. a polyketone to PVC ratio of 9:1). On the other hand, if the softening point of the PVC is to be increased, then 1–50% preferably 5–15% e.g. 10% by weight of the polyketone based upon the polymer blend composition (i.e. a polyketone to PVC ratio of 1:9) will typically be used. Other polymers may be blended with the blend composition of the present invention; the nature and amount of such a polymer will depend upon what modifications of the polymer properties are required. Furthermore the blends of the present invention may contain conventional polymer additives such as anti-oxidants, stabilisers, and mould release agents.

The scope of the present invention extends to articles for example moulded articles comprising the blends as defined hereinbefore.

The invention is illustrated by the following examples.

Materials

The materials in the blending experiments were:

uPVC compound (RPW 910 white 0092)—window profile grade supplied by Elf Atochem containing Barium/Cadmium stabiliser package, acrylic impact modifier and calcium carbonate filler. The PVC had a K value of 68. The ethylene/propylene/CO copolymer (EPCO) was compounded with 1 part per hundred (pph) milled Versal 250, 0.2 pph Erucamide and 0.1 pph Irganox 1010.

Blend Preparation

Blends were prepared using an APV 15 mm twin screw extruder. The two materials were premixed before being fed to the extruder. The barrel and die were set to a temperature of 200° C. and a screw speed of 150 rpm was used. Output rates were maintained to give 65% torque throughout production runs.

Blend Characterisation

Differential scanning calorimetry (DSC) was used to determine the melting point of the EPCO phase in each material. A heating rate of 10° C./min up to 240° C. was used to condition each material, then the sample was cooled at 10° C./min. The melting point ($T_m$) was obtained from a second heating (10° C./min) and was taken at the peak of the melting curve.

The melt flow rate of the blends, processed EPCO and uPVC were determined using a Davenport Melt Indexer. The test temperature was 220° C. and a load of 5 kgs was used.

Scanning electron microscopy (SEM) was used to examine the phase morphology in the blends. Samples were prepared by cryo polishing a surface on a pellet of material.

The vicat softening point was measured on a plaque of each material with a heating rate of 50° C./hour and a 1000 g load.

EXAMPLE 1

A series of EPCO/uPVC blends were prepared using an APV 15 mm twin screw extruder as described above. In addition samples of uPVC and EPCO were processed under the above conditions on their own. Blends containing 20, 50, 80 and 90% w/w uPVC were produced and subsequently characterised by DSC, MFR and SEM together with a determination of vicat softening point. The EPCO melting point was virtually unaffected by the addition of uPVC indicating that no significant degradation of EPCO had occurred. SEM showed the dispersed phases to be very small suggesting that these two polymers are very compatible. 10% weight addition of EPCO to uPVC gave a 5° C. increase in the vicat softening point compared to uPVC alone and 20% addition of EPCO gave a 26° C. increase in softening point. A 50/50 w/w blend of EPCO and uPVC resulted in a material with a vicat softening point of 167° C., some 77° C. higher than uPVC alone.

TABLE 1

CHARACTERISATION OF EPCO/uPVC BLENDS

| Material | $T_m$ (°C.) | MFR (g/10 mins) (220° C., 5 kgs) | Vicat Softening Point (°C.) |
| --- | --- | --- | --- |
| EPCO | 208 | 13.2 | 199 |
| uPVC | — | 1.7 | 90 |
| EPCO/uPVC (80/20 w/w) | 206 | 4.7 | 189 |
| EPCO/uPVC (50/50 w/w) | 202 | 2.5 | 167 |
| EPCO/uPVC (20/80 w/w) | 203 | 1.5 | 116 |
| EPCO/uPVC (10/90 w/w) | 202 | 1.6 | 95 |

EXAMPLE 2

A series of blends were prepared with the same uPVC compound and using the same conditions and equipment as in Example 1. A different polyketone (EPCO) was used: melting point (ex reactor) was 203° C. and MFR (ex reactor) was 31 g/10 mins (240° C. 5 kg). The blends (Examples A–I) were characterised using DMTA and mechanical properties (modulus, toughness and strength). Samples for characterisation were prepared by injection moulding and were produced on a Battenfeld BA 230 at a temperature of 200° C. and with an injection pressure of 130 bars. The mould temperature was 40° C. and mouldings were ejected after 5 seconds. Discs of 4 mm thickness and Dumbell samples with gauge sections of 4 mm thickness, 10 mm width and 70 mm length were obtained.

Film samples were also prepared using a Plasticisers film/fibre unit operated with a screw speed of 30 rpm, barrel temperature of 180° C. (hopper end); 210° C.; 215° C. and 220° C. (die). Films were hauled off at 15 ft/min. Tables 2, 3 and 4 show the properties of various samples. Table 3 relates to measurements on the film samples and Table 4 relates to measurements relating to the injection moulded samples.

TABLE 2

| Example | % wt EPCO | % wt uPVC | MFR (220° C. 5 kg) (g/10 mins) | Vicat Softening Point (°C.) | Melting Point (°C.) | Tg (°C.) 1 | Tg (°C.) 2 |
| --- | --- | --- | --- | --- | --- | --- | --- |
| A | 100 | 0 | 19.5 | 193 | 203.5 | 15.1 | — |
| B | 90 | 10 | 11.3 | 186 | 193.7 | 20 | 83.4 |
| C | 80 | 20 | 7.7 | 183 | 189 | 20.9 | 82.8 |
| D | 70 | 30 | 5.9 | 178 | 184.5 | 20.5 | 83.6 |
| E | 50 | 50 | 2.4 | 170 | 185.3 | 20.5 | 82.8 |
| F | 30 | 70 | 2.5 | 140 | 179.7 | 21.7 | 86.7 |
| G | 20 | 80 | 1.5 | 119 | 176.6 | 21.7 | 87.5 |
| H | 10 | 90 | 1.3 | 96 | 170 | 21.7 | 87.5 |
| I | 0 | 100 | 1.4 | 78 | — | — | 88.3 |

The results of the characterisations are given in Table 1. The presence of uPVC has little effect on the EPCO melting point (it decreases by up to 6° C.). This would indicate that the crystallinity of the EPCO did not significantly change suggesting that little or no degradation of the EPCO had occurred. The melt flow rates of the blends decreased with increasing uPVC content. SEM indicated that the blends were very compatible and suggested that in some cases the PVC and EPCO were miscible.

TABLE 3

| Example | Modulus 100° C. (MPa) FILM | Tensile Modulus at 23° C. (MPa) FILM | Yield Stress (MPa) FILM | Ultimate Stress (MPa) FILM | Elongation to Failure (%) FILM |
| --- | --- | --- | --- | --- | --- |
| A | 374 | 500 | 32.5 | 56.7 | 435 |
| B | 332 | 700 | 34.9 | 59.2 | 350 |
| C | 242 | 640 | 30.3 | 51.6 | 315 |
| D | 215 | 450 | 23.7 | 39.1 | 255 |
| E | 186 | 1025 | 33.6 | 50.6 | 200 |
| F | 112 | 1230 | 34.1 | 43.3 | 140 |
| G | 94 | 1460 | 38.5 | 43.4 | 115 |
| H | 63 | 1570 | 39 | 43.7 | 115 |
| I | 39 | 1480 | 38.1 | 41.9 | 110 |

TABLE 4

| Example | Flexural at 23° C. (MPa) Modulus (ASM D790M-82) Moulding | Yield Stress (MPa) Moulding | Ultimate Stress (MPa) Moulding | Elongation to Failure (%) Moulding | Izod Impact Strength (J/m) at 23° C. and 50% RH Moulding |
| --- | --- | --- | --- | --- | --- |
| A | 1146 | 47.6 | 63.5 | 714 | 90 |
| B | 1255 | 44.5 | 57.1 | 673 | 102 |
| c | 1368 | 43.1 | 43.8 | 474 | 89 |
| D | 1519 | 43.1 | 37.7 | 211 | 93 |
| E | 1880 | 43.6 | 36.6 | 100 | 104 |
| F | 2297 | 43.6 | 35.5 | 92 | 113 |
| G | 2466 | 45.6 | 35.7 | 72 | 107 |
| H | 2522 | 43.2 | 33.1 | 65 | 97 |
| I | 2579 | 44.5 | 31.7 | 63 | 113 |

We claim:

1. A polymer blend composition consisting essentially of a polyketone and PVC provided that the polyketone is a linear polymer having an alternating structure of a) units derived from carbon monoxide and b) units derived from one or more olefinically unsaturated compounds and is not a propylene/CO copolymer having a number average molecular weight of less than 10,000.

2. A polymer blend composition as claimed in claim 1 wherein the polyketone has a number average molecular weight in the range 40,000 to 1,000,000.

3. A polymer blend composition as claimed in claim 2 wherein the polyketone has a number average molecular weight in the range 60,000 to 150,000.

4. A polymer blend composition as claimed in claim 1 wherein the polyketone has a melt flow rate with 5 kg load at 240° C. in the range 5 to 150 g per 10 minutes.

5. A polymer blend composition as claimed in claim 4 wherein the polyketone has a melt flow rate with 5 kg load at 240° C. in the range 40 to 80 g per 10 minutes.

6. A polymer blend composition as claimed in claim 1 wherein the PVC has a K-value in the range 45 to 100.

7. A polymer blend composition as claimed in claim 6 wherein the PVC has a K-value in the range 60 to 70.

8. A polymer blend composition as claimed in claim 1 wherein the polyketone is derived from ethylene and optionally one or more $C_3$ to $C_6$ normal alpha-olefins.

9. A polymer blend composition as claimed in claim 8 wherein the polyketone is an ethylene/propylene/CO terpolymer.

10. A polymer blend composition as claimed in claim 1 wherein the PVC is unplasticised PVC.

11. A polymer blend composition as claimed in claim 1 wherein the weight ratio of polyketone to PVC is in the range 1:10 to 10:1.

* * * * *